(12) United States Patent
Kukharev

(10) Patent No.: US 11,608,197 B2
(45) Date of Patent: Mar. 21, 2023

(54) TECHNOLOGY FOR OBTAINING FREE ELECTRICITY AT MOMENTS OF GRAVITATIONAL RESONANCES

(71) Applicant: Vadim Kukharev, Moscow (RU)

(72) Inventor: Vadim Kukharev, Moscow (RU)

(*) Notice: Subject to any disclaimer, the term of this patent is extended or adjusted under 35 U.S.C. 154(b) by 344 days.

(21) Appl. No.: 16/991,624

(22) Filed: Aug. 12, 2020

(65) Prior Publication Data

US 2022/0024613 A1   Jan. 27, 2022

Related U.S. Application Data

(60) Provisional application No. 63/054,923, filed on Jul. 22, 2020.

(51) Int. Cl.
| | | |
|---|---|---|
| H02J 50/00 | (2016.01) |
| B64G 1/42 | (2006.01) |
| B64G 1/10 | (2006.01) |
| G01V 7/00 | (2006.01) |

(52) U.S. Cl.
CPC ............ *B64G 1/421* (2013.01); *B64G 1/10* (2013.01); *G01V 7/00* (2013.01); *H02J 50/001* (2020.01)

(58) Field of Classification Search
CPC ........... H02J 50/001; H02J 50/10; H02J 50/12
See application file for complete search history.

(56) References Cited

U.S. PATENT DOCUMENTS

| | | | | |
|---|---|---|---|---|
| 6,160,336 A * | 12/2000 | Baker, Jr. | ............... | H02K 7/025 |
| | | | | 290/55 |
| 10,520,615 B1 * | 12/2019 | Sibgatulin | ............... | G01V 1/02 |
| 2006/0029178 A1 * | 2/2006 | Tahan | ..................... | G21G 1/12 |
| | | | | 376/100 |
| 2008/0128559 A1 * | 6/2008 | Ho | ....................... | B64G 1/1021 |
| | | | | 244/164 |
| 2010/0109473 A1 * | 5/2010 | Peterson | .............. | H02N 11/002 |
| | | | | 310/306 |
| 2015/0102675 A1 * | 4/2015 | Dinwiddie | ........... | H02N 11/002 |
| | | | | 174/6 |

(Continued)

OTHER PUBLICATIONS

Siegel, Ethan, "Ask Ethan: Can We Extract Energy From Gravitational Waves?", May 8, 2020, Forbes, pp. 1-11 (Year: 2020).*

(Continued)

*Primary Examiner* — Daniel Cavallari
*Assistant Examiner* — Joseph N Inge
(74) *Attorney, Agent, or Firm* — Nadya Reingand

(57) ABSTRACT

The present invention describes methods, systems, and devices for utilizing high-intensity regions within atmospheres of planetary bodies to receive and harvest electricity. Such high-intensity regions are formed as a result of the combined gravitational forces affecting a given planetary body and particularly the particles within the atmosphere of that planetary body. The combined gravitational forces result in a gravitational resonant frequency which affects the atmosphere most intensely within said high-intensity regions. By determining moments of gravitational resonant frequencies based on a given location, the methods, systems, and devices described herein utilize the energy provided within the high-intensity regions during the determined moments. Harvesting and further transmitting the collected energy is also disclosed.

16 Claims, 12 Drawing Sheets

(56) References Cited

U.S. PATENT DOCUMENTS

| | | | |
|---|---|---|---|
| 2015/0323386 A1* | 11/2015 | Hoeffner | G01S 17/95 |
| | | | 356/402 |
| 2017/0025148 A1* | 1/2017 | Boyd | G11B 20/1816 |
| 2017/0117714 A1* | 4/2017 | Dinwiddie | H02J 4/00 |
| 2018/0081075 A1* | 3/2018 | Smiarowski | G01V 3/165 |
| 2018/0277259 A1* | 9/2018 | Jacobson | H05H 1/10 |
| 2019/0181686 A1* | 6/2019 | Adolf | H01P 3/08 |
| 2019/0218737 A1* | 7/2019 | Hansmann | F03B 13/12 |
| 2020/0103514 A1* | 4/2020 | Chun | G16H 50/20 |
| 2021/0048246 A1* | 2/2021 | Lévai | H04B 5/0025 |

OTHER PUBLICATIONS

Scharf, Caleb A., "Fun with Gravitational Waves", Jun. 22, 2017, Life Unbounded Scientific America, pp. 1-4 (Year: 2017).*

Lewis, Melvin A., "Gravitational-Wave Versus Electromagnetic-Wave Antennas", Jun. 1995, IEEE Antennas and Propagation Magazine, vol. 37, No. 3, pp. 26-31 (Year: 1995).*

Pinto, Iara R. C. A., Pinto, Jr., Osmar. "Moon Effect on Lightning", Sep. 28-Oct. 2, 1995, 2015 International Symposium on Lightning Protection (XIII SIPDA), pp. 349-350 (Year: 2015).*

Liu, Jiafu, McInnes, Colin R., "Resonant space tethered system for lunar orbital energy harvesting," Acta Astronautica, 156, 2019, pp. 23-32 (Year: 2019).*

Lewis, Melvin A., "Sleuthing out Gravitational Waves," IEEE Spectrum, May 1995, pp. 57-61 (Year: 1995).*

* cited by examiner

TECHNOLOGY FOR OBTAINING FREE ELECTRICITY AT MOMENTS OF GRAVITATIONAL RESONANCES

CROSS-REFERENCE TO RELATED APPLICATIONS

The present patent application claims priority to U.S. provisional patent application 63/054,923 filed Jul. 22, 2020, which is incorporated herein in its entirety.

FIELD OF THE INVENTION

The present invention relates to the field of collecting, storing, and transmitting energy obtained from natural sources, particularly from the electromagnetic effects of gravitational resonances on planetary or other bodies.

BACKGROUND OF THE INVENTION

Lightning discharges, as many currently think, are the primary natural source of the excitation of Schumann resonances exhibited in the Earth's atmosphere. The current invention contradicts prior art belief and instead suggests that Schumann resonances are essentially excited by the Moon. The Moon, causing gravitational resonances relative to the Earth, excites the fluids/particles in the ionosphere. Such excitations, in turn, create low-frequency vibrations in a region that is identified in the following description of the present invention. The following description further explains how it is, in fact, this region, and not lighting, which directly causes Schumann resonances and other phenomena.

SUMMARY OF THE INVENTION

Free energy/electricity is obtained based on the disturbances of particles located within varying layers of the atmosphere, resulting from gravitational forces from either the Moon or the Sun, or both, resulting in gravitational resonances when the values of these gravitational forces cause the disturbances of the particles to coincide in frequencies. The present invention utilizes this disturbance of the ionosphere and the onset of stratopauses as the result of the gravitational resonances caused, e.g., by the Moon on the Earth. It is noted that the Sun-Moon-Earth system provides a non-limiting example embodiment of the present invention.

It has been experimentally established by the inventor that the resonances of gravitational tides enhance the natural oscillations of fluids located in the Earth's atmosphere. Gravitational energy from a given mass acts equally on all fluids within the atmosphere of a body. It was further experimentally observed that varying resonant frequencies existed for fluids having different densities. The ionosphere, stratosphere, and other layers of the Earth's atmosphere, each comprising fluids of differing densities, similarly emit resonant frequencies when gravitational masses coincide. Accordingly, at points of the influence of gravitational energy in the ionosphere, there exists a source of oscillations comprising standing electromagnetic waves. These oscillations further propagate throughout the ionosphere and are audible and collectible throughout varying regions of the planet's atmosphere.

A significant advantage resulting from the technology of the present invention is that its application allows for the harvesting of energy in both a free and inexhaustible nature.

BRIEF DESCRIPTION OF THE DRAWINGS

The present invention will now be discussed in further detail below with reference to the accompanying figures in which.

DETAILED DESCRIPTION OF PREFERRED EMBODIMENTS

Definitions

"Kukharev region(s)," as used herein, is defined as a high-intensity region of the Earth's atmosphere, e.g., comprised of several layers of the ionosphere, which provides a source of electromagnetic waves at an intensity greater than surrounding regions of the Earth's atmosphere. Kukharev regions are formed by gravitational resonances in media including but not limited to any atmosphere, ionosphere, interplanetary plasma, and interstellar plasma. During a gravitational resonance, Kukharev regions observe electricity and temperature jumps significantly greater than any surrounding areas. Kukharev regions may form in the Earth's atmosphere, or between planets, stars, and/or galaxies. Scientifically speaking, Kukharev regions appear at moments of gravitational resonances in all fluids. Such fluids include, but are not limited to, the atmosphere, stratosphere, ionosphere, interplanetary plasma, interstellar plasma, and other similar fluid formations.

In general, the center of the Kukharev region can be considered as the geometric center of the fluid (at approximately equal density). Simplistically, this point may be considered as comprising the maximum force of the gravitational energy of the Moon; more specifically, however, if solving in detail based on a specific case, which takes into account all force barycenters, one will find that this point is constantly moving. If one is able to remain inside the Kukharev region as it moves, one may continue to receive free energy by utilizing the present invention.

A "gravitational resonance(s)," "day(s) of resonance," or "resonance(s)," are used herein, are defined as one or more moments in time when the combined gravitational wave oscillations from the Moon, Sun, and the Earth match in phase, and thereby constructively interfere with each other to form an increased amount of emitted energy, which collects itself within a Kukharev region.

The barycenter of the Earth-Moon system revolves around the Sun. In this case, due to the difference in masses (the mass of the Moon is about 81 times less than the mass of the Earth), the barycenter of the Earth-Moon System is located inside the Earth's surface, fluctuating between a depth of 1200 km and 1900 km below the Earth's surface during a lunar month. If the center of gravity of a physical system does not coincide with the geometric center, then during rotation of the physical system, periodic oscillations of stresses (i.e. deformations) arise, as observed and utilized by the present invention.

Figure 1:
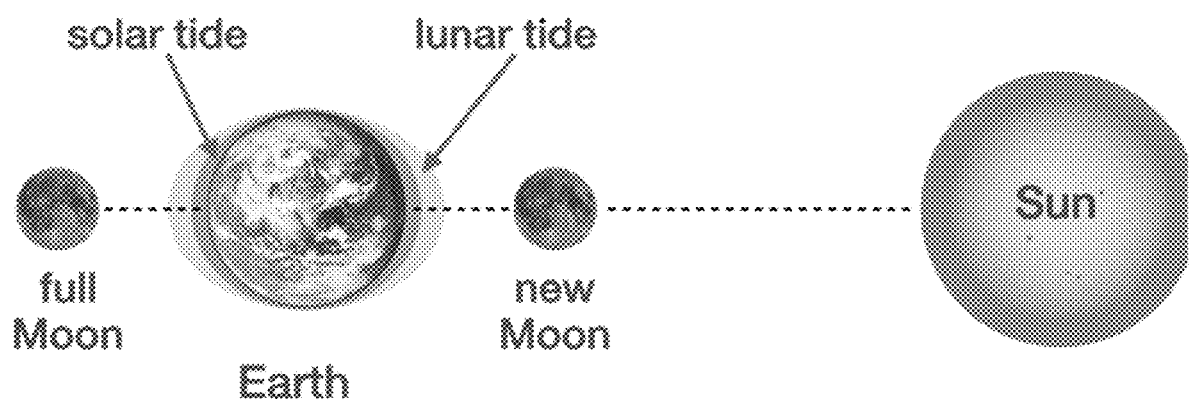
FIG. 1 illustrates the ebb and flow of the seas on Earth, based on the lunar and solar tides.

The ebb and flow of the Earth's seas and oceans occurs mainly under the influence of the gravitational force of the Moon (see FIG. 1). Practically, there is daily general ebb and flow, and there is also a stronger 14-day ebb/flow cycle (and 28 more days). The source of the 14-day ebb/flow cycle are: (1) the Moon (primarily), and (2) the position of the Earth-Moon-Sun system barycenter (secondarily).

Although the magnitude of the gravitational force of the sun on the Earth is almost 200 times greater than the magnitude of the gravitational forces of the moon on the Earth, the tidal forces on the Earth as generated by the moon are nearly twice as large as those generated by the sun. This is due to the fact that tidal forces do not depend on the magnitude of the gravitational field, but on the degree of its non-homogeneity. With increasing distance from the gravitational field source, the degree of non-homogeneity decreases faster than the magnitude of the gravitational field itself. Since the Sun is almost 400 times further from the Earth than the Moon, the tidal forces caused by solar activity are significantly weaker.

The ionosphere is the boundary part of the Earth's atmosphere in which the level of ionization is high enough to have a noticeable effect on the propagation of radio waves. The lower boundary of the ionosphere is located at an altitude of 50-60 km, and the upper boundary at an altitude of about 1,000 km. The upper boundary of the ionosphere passes into the plasmasphere or other magnetospheric plasma formations.

The appearance of resonances of gravitational tides follows from Newton's theory of gravitation. The ionosphere (comprising all of its layers) is defined as the ionized portion of the Earth's upper atmosphere, from about 50 km to 1,000 km in altitude from the Earth's surface; a region that includes the thermosphere and parts of the mesosphere and exosphere.

The general schematic diagram of the technology for obtaining free electricity comprises:

1. Example objects affected by gravity:
   A) The ionosphere (in all its manifestations), as well as the atmosphere;
   B) Plasma (including both interplanetary and interstellar);
   C) Clouds in the atmosphere and air masses in the atmosphere (while their effect on ion resonances is small, they have an effect on ionospheric resonances);
   D) Seas and oceans.

2. Example objects as sources of gravitational forces:
   A) the Earth;
   B) the Moon;
   C) the Sun;
   D) Mars, Venus, and other planets (with influence lowering with distance);
   E) Stars (with lower influence).

Obtaining free electricity on Earth may be reduced to the following method:

1. Install the power receiver (wireless type) in a specific location (with known coordinates of latitude, longitude, and altitude).
2. Calculate the moments of gravitational resonances and the frequency at which the resonances will occur, using said coordinates:
3. At the calculated moments of gravitational resonance, the gravitational field of the Moon, Sun, and the Earth will most strongly impact the fluids (i.e. the ionospheric clouds and other fluids within the atmosphere), thereby causing vibrations and resonances in those fluids' structure. The ionospheric fluids will create the most energy during each moment of gravitational resonance calculated, during which said power receiver(s) should be powered on and set to a receiving frequency equal to that of the calculated resonant frequency.
4. On normal days (i.e. days comprising non-resonant frequencies), the power receiver may also function, although at a significantly lower level.

Since the gravitational field of the Moon constantly changes its location (as a result of the moon's rotation around the Earth, tides of fluids in the form of air and/or ion clouds are also continuously formed along varying regions of the ionosphere and atmosphere of the Earth. These tides, particularly at moments of gravitational resonances, are the strongest for a determinable point along the Earth. At these moments, these locations will be subject to the most powerful vibrations at resonant frequencies, which are the source of the free electricity of the present invention. On resonant frequency days, the power receiver may collect and store energy (e.g., on connected batteries) to provide uninterrupted, continuous, and free electricity to nearby consumers.

It has been experimentally established that the resonances of gravitational tides amplify their own vibrations of fluids on the Earths surface and below the surface, which allows for the further extrapolation of this idea to large masses of fluids in the ionosphere.

The power receiver may be connected to or coupled to any moving object (e.g., a car, ship, boat, airplane, spacecraft, etc.). Thereby, the surface device that a satellite receiving device might be connected to, may be located on or itself comprise a moving vehicle, said vehicle moving along the planet's surface correlating to the movement of the satellite receiving device. Depending on the speed of its movement, as well as the rate of change in the gravitational fields that are associated with ion clouds, one can recalculate the resonances and thereby recalculate the frequencies at which to receive the energy.

Figure 3:
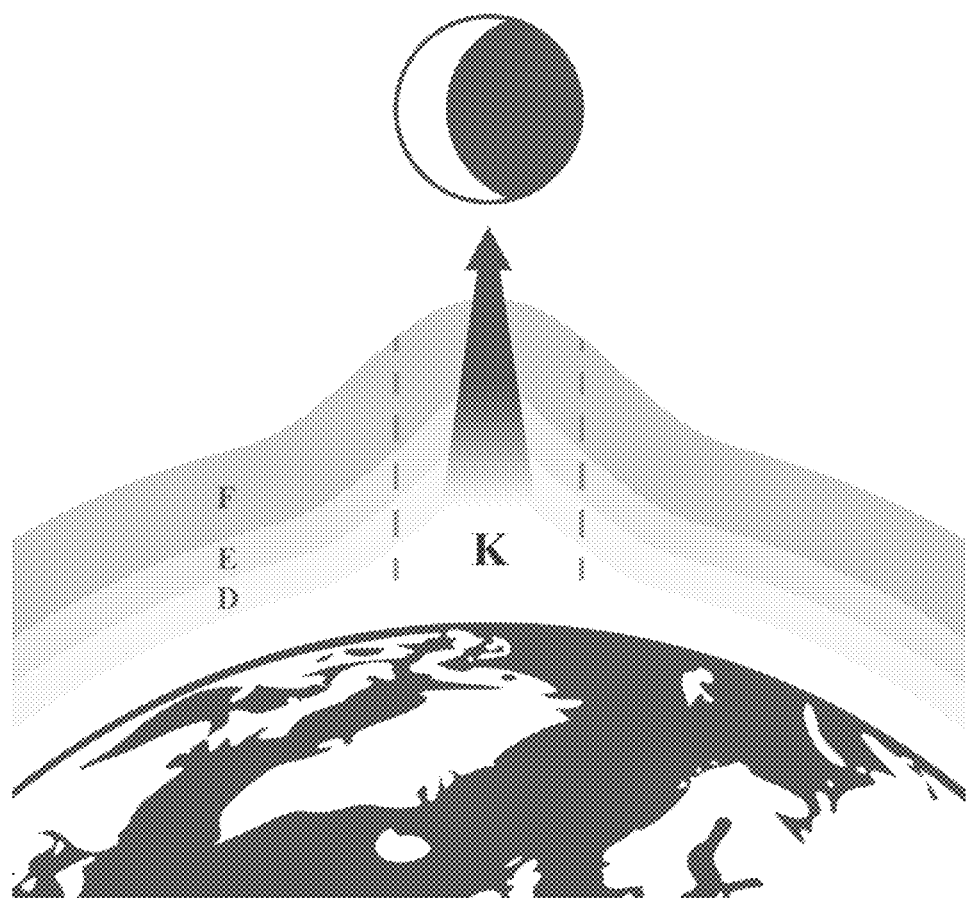
FIG. 3 shows various layers within the ionosphere.
Figure 4:
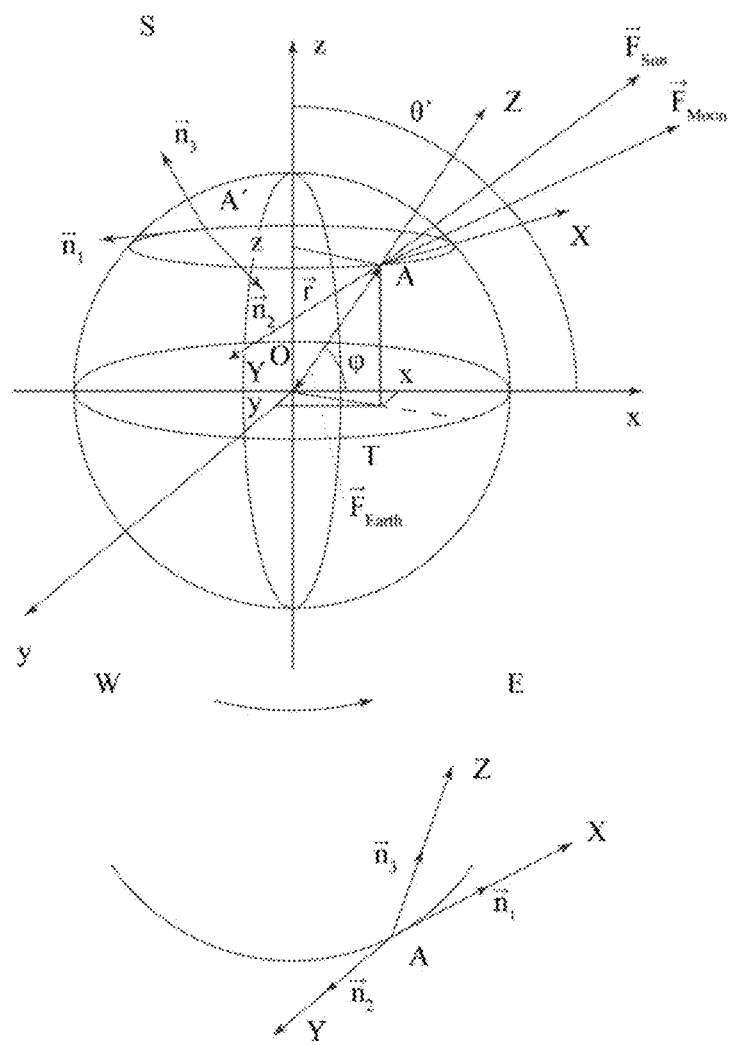
FIG. 4 illustrates a general scheme for force vectors.

The basic scheme of operation of a Kukharev region, as defined by this invention, is shown in FIGS. 3-4.

Figure 2:
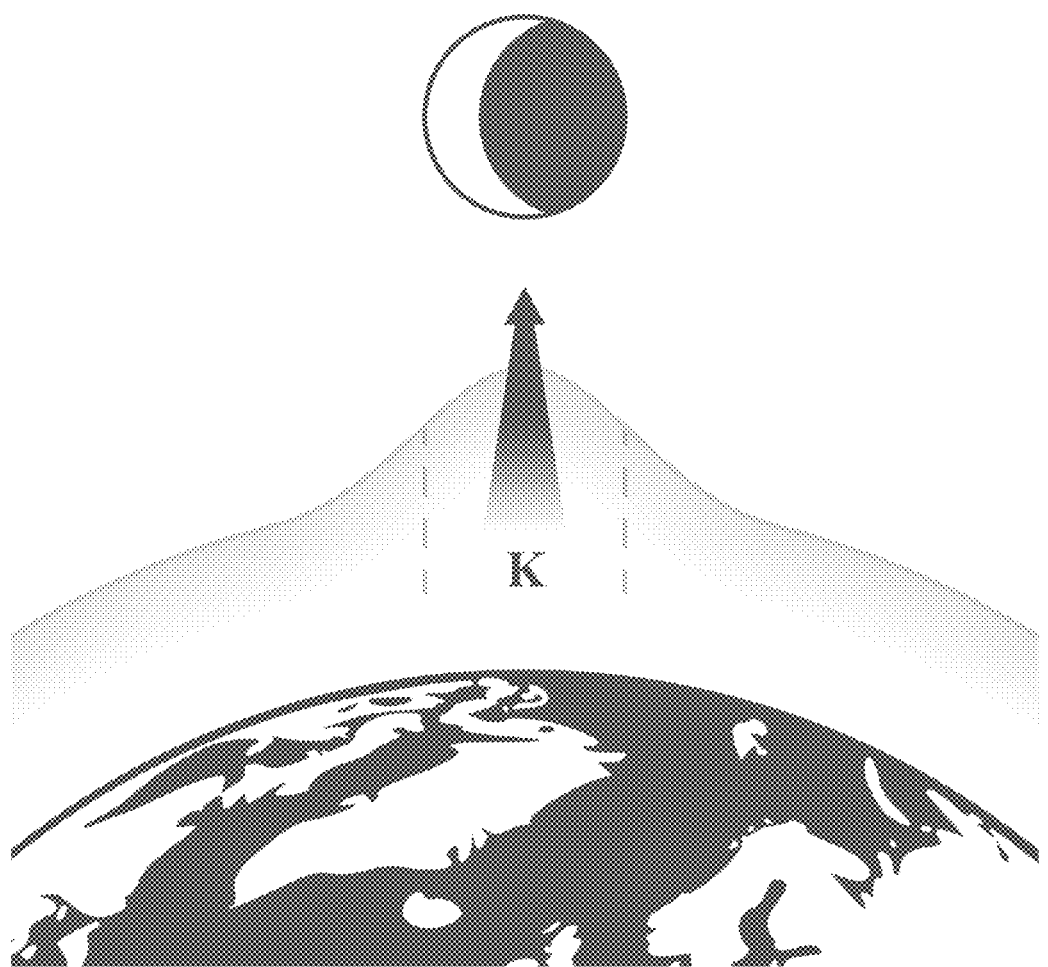
FIG. 2 shows a simplified view of a given tide and a given Kukharev region of the ionosphere.

The Kukharev region (referenced by the letter K in FIGS. 2-3) is the region of maximum power from which vibrations (including but not limited to Schumann resonances) are generated. It is within this region that the greatest amounts of energy may be received at moments of gravitational resonances. Kukharev regions may form in various layers of the Earth's atmosphere. The most powerful of these regions on Earth are formed every 14 days (i.e. corresponding to 14-day gravitational resonances of lunar-influenced tides). In addition, smaller intensity Kukharev regions also form more frequently within the Earth's atmosphere every 3 days, typically at altitudes between 50 km and 60 km). In general, the center of this region can be considered, for calculational purposes, as the geometric center of the fluid (with approximately equal density).

It is further noted that Kukharev regions exist throughout the universe and are not limited to the Earth's atmosphere or immediate surroundings. For example, Kukharev regions may exist in the atmospheres of any planet within our solar system or other solar systems, between stars, galaxies, and any other complex systems comprising gravitational resonances. The scheme is also valid for, e.g., satellites orbiting Venus, Mars, and other planets. In addition, it is possible to imagine the Sun as an only source of gravity that impacts cosmic plasma and other interstellar fluids, thereafter directing spacecraft to the centers of fluids impacted based on gravitational resonances calculated.

The location of a Kukharev region also depends on the structure of the fluid in the atmosphere. Since this is an analog of a membrane, a resonant carrier frequency occurs in the fluid, but the point of origin and maximum power depend on the size of the membrane and its structure.

The Kukharev region is, in some embodiments, a location comprised of low-frequency standing electromagnetic waves. In other embodiments, the Kukharev region is a location comprised of powerful electromagnetic waves, emitted as a result of a powerful gravitational resonance. Such gravitational resonances further cause the Kukharev region to experience an increase in temperature, where the increase in temperature correlates to the amount of electromagnetic energy emitted within that region. Such an increase in energy assists in explaining the appearance of a temperature increase in the stratopause (i.e. altitudes of 50-60 km) a previously unexplained phenomenon. The Kukharev region also moves rapidly in the wake of the Moon. Accordingly, if one is located within and is able to remain inside the Kukharev region, energy may be gathered utilizing devices for gathering and/or storing power, as described further herein. The entire Kukharev region, in general, may thereby be described as comprising an antenna radiating a standing electromagnetic wave.

Figure 7:
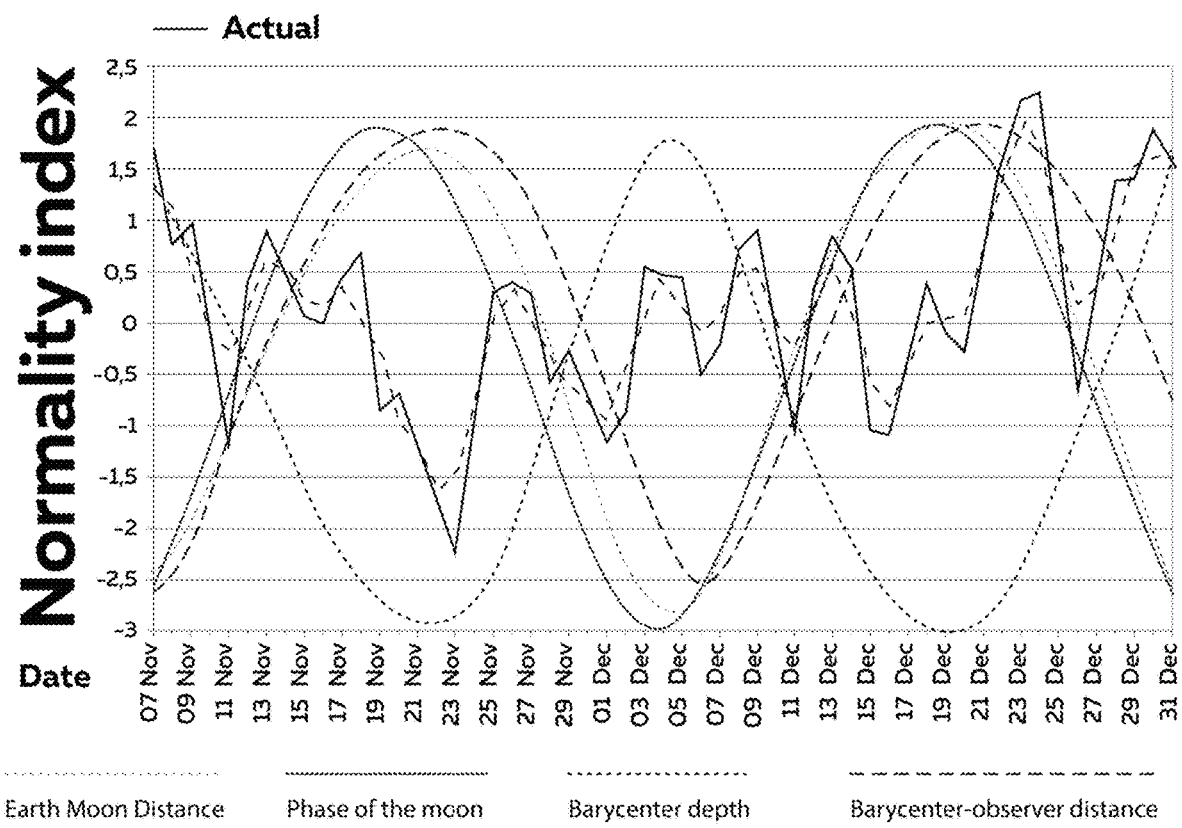
FIG. 7 shows exemplary graphs comparing experimental data obtained regarding a location in the territory of the northwestern part of the Zagros mountain system, based on the present invention.

FIG. 7 shows obtained facts for a specific point on the Earth (i.e., the Zagros Mountains forming the Iran-Iraq border). The following information is provided and compared: (1) temperature change from November 7 to December 31, (2) Moon phases, (3) barycenter depth, (4) distance from the Earth to the Moon, (5) distance between barycenter and observing device. Regarding the normality index (i.e. y-axis) of FIG. 7, the lunar phase values are indicated as the inverse proportion of the visible part percentage. More particularly, the normality index, $\delta T$, which characterizes temperature anomalies in a disturbed atmosphere, was calculated using the following formula:

$$\delta T = \frac{T(\varphi_i, \lambda_i, N, t, p) - Tf(\varphi_i, \lambda_i, t, p)}{\sigma T},$$

where $\varphi_i$=latitude, $\lambda_i$=longitude, N=date, t=time of measurement, p=the pressure on the Isobaric surface, and thereby $T(\varphi_i, \lambda_i)$=temperature in the disturbed atmosphere at date N, at time t, at Isobaric level p, and $T_f T_f(\varphi_i, \lambda_i, t, p)$=the background average temperature for the study period for time t, at level p.

Finally, in the above formula, $\sigma T$=the standard deviation, as calculated via the following formula:

$$\sigma T = \sqrt{\frac{\sum_{j=1}^{n}(T_j - T_f)^2}{n-1}},$$

where $T_j$ is the temperature value, (j=7, ..., n), and where n=54 days. I.e., $T_f$ is the average value of the background temperature for the study period at time t, and for the Isobaric level, p.

A full moon has a value 0; a new moon has a value of 1. All distances indicated correlate to the range from 0 to 1.

Figure 12:
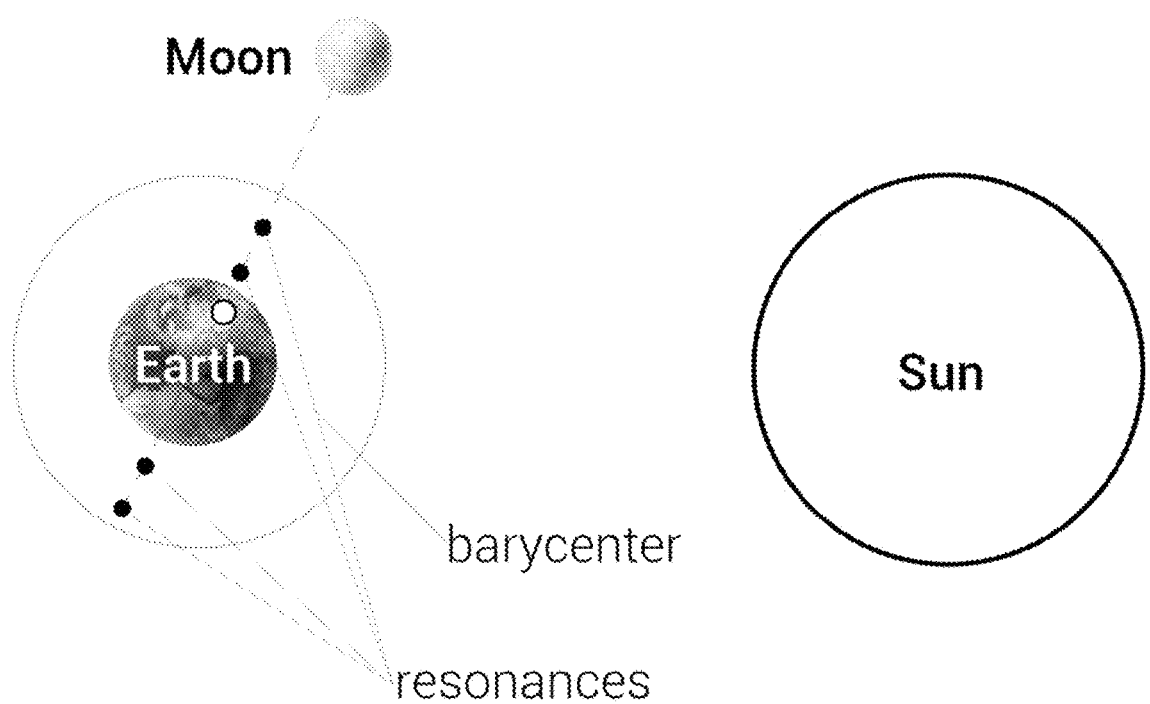
FIG. 12 shows an exemplary resonance comprising two resonances, both occurring at the same time.

Barycenter depth is defined as the distance between the center of mass of the Earth-Moon system to the Earth's surface. See FIG. 12 (not drawn to scale), which provides an illustration of the center of mass (i.e. barycenter) of the Earth-Moon system. It can also be taken into account that the Earth-Moon barycenter revolves not just around the Sun but around the center of the Solar system masses (that is close to the Sun's surface).

Figure 13:
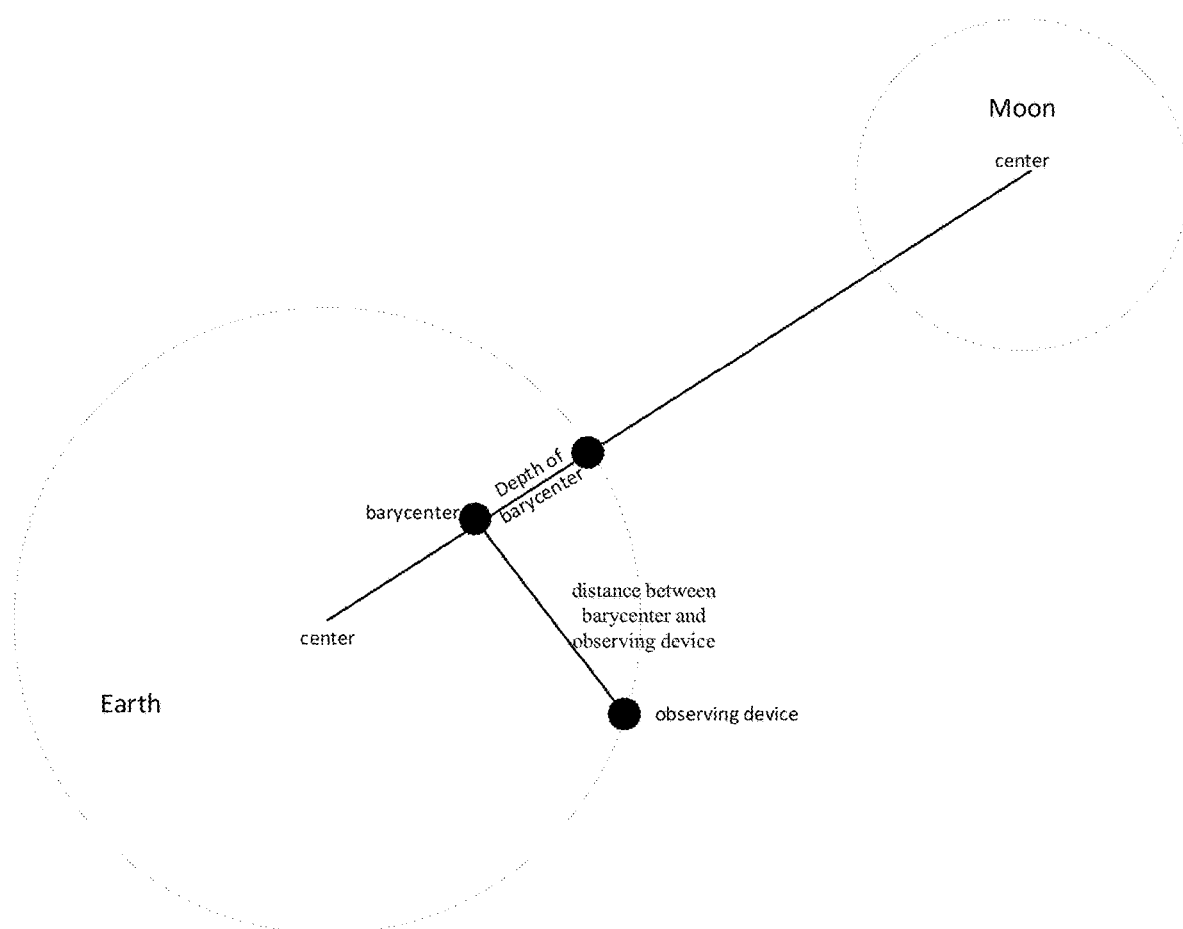
FIG. 13 illustrates the barycenter of the Earth-Moon System, the barycenter depth, the line connecting centers of the Earth and the Moon, the observer-barycenter distance, and the observer/observing device location.

As a further illustration, see FIG. 13, which further delineates the difference between the barycenter depth and the barycenter-observer distance, which are two distinct values. As FIG. 13 further shows, the barycenter depth is equal to the distance from the center of mass of the Earth-Moon system to the surface of the Earth (or other body). The barycenter depth always lies along the line connecting the centers of the Earth and the Moon (or any body and any one of its satellite moons). The observer-barycenter distance is, in contrast, the distance between the barycenter and an observer/observing device, which may be located anywhere along the Earth's surface (and is likely not directly on said line between the Earth and the Moon connecting the two).

Figure 8:
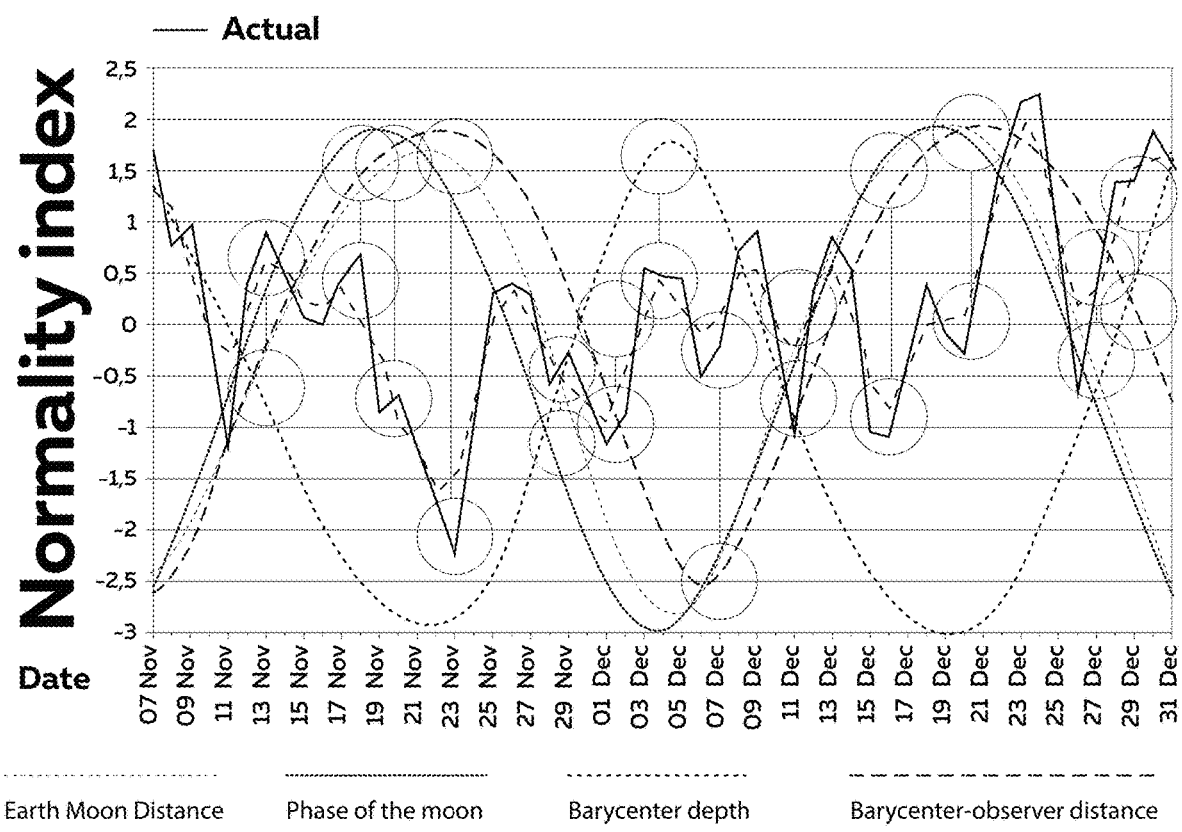
FIG. 8 indicates moments of gravitational resonances within FIG. 7, as analyzed and utilized by the present invention.

FIG. 8 indicates valuable information for the present invention, via circles and lines connecting said circles, indicating a correlation, as obtained from analyzing the data provided in FIG. 7. FIG. 8 shows that:

(1) The moments of gravitational resonance coincide with the moments of sharp temperature gradients (i.e. temperature jumps), as shown by the line-connected circles;

(2) Gravitational resonances, i.e., those circled moments where the gravitational wave oscillations of the Moon, the Sun, and the Earth, match in phase combine to form the effects utilized by the present invention. At these moments, the gravitational wave oscillations combine optimally. The gravitational resonances occur at the intersections of the lines indicating Moon phases, barycenter depth, distance between the Earth to the Moon, and barycenter-observer distance.

(3) The correlation between moments of gravitational resonance and sharp temperature gradients, is 100%. Thereby, the resonances are directly related to the sharp temperature fluctuations, and the sharp temperature fluctuations are results of the gravitational resonances.

According to the above data, it is concluded that as soon as gravitational resonances occur, a Kukharev region is formed in the Earth's atmosphere. Within this region, the multiple effects of gravity, as discussed herein, accelerate the particles in said region. This particle acceleration in the region creates:

(1) A stratopause, formed at an altitude of 50-60 km above the selected point of the Earth's surface (the Earth is a non-limiting example, as such effects would exist on any planet or body exposed to gravitational forces);

(2) Schumann resonances, i.e., previously unexplainable oscillations of the ionosphere, or which have been previously attributed to thunder/lighting;

(3) Previously unexplainable local changes in the gravitational field, as well as prior flight anomalies based on satellite information;

(4) Symmetry violations and quantum anomalies. Kukharev regions exhibit notable effects in the quantum microcosm. Rather than electronic, electromagnetic discharges and standing waves occurring in the stratopause, there are bosonic and quark waves at the microlevel. Such bosonic and quark waves can similarly be observed for corresponding microgravitational resonances. Moreover, many symmetry violations and quantum anomalies in the microcosm result from the appearance of Kukharev regions at a nanoscale level. It is known that gluons (vector gauge bosons) revolve around electrons, similar to the Moon's revolution around the Earth. By determining the statistics as described herein, one may identify the Kukharev regions at the micro-level, and find analogs of the micro-level Kukharev regions in the stratopause, flyby anomalies, and Schumann resonances.

FIG. 8 thereby confirms that at almost the exact moments of gravitational resonances, there are concurrent sharp fluctuations in the temperature of layers of the atmosphere corresponding to the stratopause. It therefore follows that the emerging Kukharev regions are the direct causes of these sharp temperature fluctuations in the ionosphere. The phases of the moon, the distance between the earth and the moon, and the depth of the barycenter of the earth-moon system to the earth's surface are shown. The graphs show the anomaly index of the vertical temperature profile for the Northwest Zagros mountain range.

The frequency (Y) of standing wave vibrations in a given fluid is determined by the following relationship:

$$Y=1(T(V)) \qquad \text{(Equation 1)},$$

where T(V)=period fluctuations per volume of the fluid, and where V, the volume of the fluid, is calculated by the following relationship:

$$V=M/p \qquad \text{(Equation 2)},$$

where "M" is the mass of the fluid, and where "p" is the density of the fluid.

If the mass is equal, the resonant volume of the gas is greater for a less dense fluid. Consequently, a less dense fluid will have a lower frequency than a more dense fluid.

As mentioned, the boundaries of a Kukharev region also provide significant power in addition to that energy received at the region's center. There are local maxima of emission of a standing electromagnetic wave at the border of the two media.

For better accuracy, it is necessary to take into account in practice that the fluids in the ionosphere are non-homogeneous and have varying densities. Accordingly, the location of the Kukharev region may not necessarily coincide with the geometric center of a given area. In such cases, one must normalize the density based on actual data. One may also utilize Ricci flows when combining multiple conditions. Another option would be to form an array of several satellites that, based on the geometric center of the ion fluid and the calculation of the gravitational resonance, would jointly balance via, e.g., dynamically changing locations, in order to receive the maximum amount of free electricity as a whole system.

At the moments of gravitational resonance, a standing wave occurs in the fluid of the ionosphere. This occurs under the influence of the gravity of objects surrounding the Earth, the main contribution being made by the Moon. The resulting wave that occurs in the fluid of the ionosphere is formed along the combination of layers forming the ionosphere, but in the center of the Kukarev region, the amplitude of the standing wave, and thus its power, is greatest. See FIG. 3. The entire fluid of the Kukharev region essentially comprises a radiating antenna which gradually moves along the Earth's surface according to the gravitational forces acting on that atmosphere. Any power receiver receiving energy according to the invention should be located as close to the Kukharev region center as possible. It is noted that receivable power drops rapidly with distance from the Kukharev region center, with the exception of Kukharev region boundaries.

Due to the above data regarding Kukharev regions, the ideal infinite charge of a satellite comprising a power receiver would occur via an endless surfing of the satellite along the wave of an ion tide, as detected via the present invention, at the maximum of its energy (i.e., a Kukharev region center) as the wave of the ion tide circles the Earth's surface. Alternatively, multiple satellites could be positioned around the Earth. The radiating Kukharev region formed in the ionosphere is constantly moving based on the wake of the Moon, and thus the receiving device must constantly move in the wake, thereby keeping up with the radiating Kukharev region to receive a maximum amount of power/energy.

In addition to ion clouds in the ionosphere, the gravitational fields of the Moon and the Sun also individually affect other layers of the Earth's atmosphere. Accordingly, the technology described herein is ideally effective for aircraft and satellites that fly at an altitude within any such layer of the Earth's atmosphere, as they would have the capability, via the present invention, to constantly receive power, especially during moments comprising gravitational resonances. One effective option is to constantly follow any satellites located in the gravitational resonance region, approximately in the middle of the ionosphere.

As an example, practical receipt of free electricity on spacecraft vehicles may comprise the following:

1. Installation of an electric power receiver (preferably wireless type) on the spacecraft vehicle (also, installation of software, which comprises providing pre-determined coordinates for given times).

2. Utilization of pre-determined coordinates to calculate moments of gravitational resonance and their frequencies (the fluid comprises interplanetary and interstellar plasma).

3. During said calculated moments of gravitational resonance, the gravitational field affects the plasma cloud at a maximum level, thereby causing a maximal vibration and resonance. Programming the power receiver to operate on said determined days and frequency of resonances.

Ultra-low frequency vibrations comprise input received by the power receiver. The frequency of these vibrations depends on the complex nature of the ionospheric fluids and the location where the coupled device is moving or positioned. For practical purposes, the frequency of the receiver on the satellite should be able to adjust to the specific area through which it moves, and should generally be programmable to receive frequencies, e.g., between about 0 Hz and about 100 Hz, between about 0 Hz to 100 kHz, and other ranges which are likely to occur based on the known approximate altitudes of Kukharev regions (approx. 55 km, and approx. 120 km). Base frequencies change, typically increasing year to year, the change being caused by the constant transmission of new portions of gravitational energy which constantly impacts the fluids of the Earth's atmosphere. Due to such continuous change, the dynamics of those fluids of the ionosphere (and other layers) fluctuate more and more every year (assuming no other external factors). Therefore, programmability of varying ranges of receivable frequencies is a desired feature of any receiving device employing the methods of the present invention.

Gravitational resonances, particular those affecting the ionosphere, are also the cause of thermal resonances in the atmosphere, the thermal energy of which may also be utilized by power receivers. Local free reception of electricity on the Earth's surface is therefore possible on other frequencies. The power received will be relatively small compared to the power received from gravitational resonances in Kukharev regions, and the calculation would be related to cloud fluctuations.

Calculations of the Kukharev region to determine the maximum power can be performed individually for any point in space. The Earth's atmosphere comprises several layers of fluids. The frequencies will vary based on the composition of each layer. Due to the volume of atmospheric fluids on the Earth's surface, there is minimal energy that may be harvested via prior art methods. The present invention provides for new methods, systems, and devices for collecting free electricity which are significantly more effective, based on the Kukharev regions found at stratopause levels (i.e., 50-60 km above the earth's surface) and at levels above 120 km above the Earth's surface (where temperature anomalies are also visible).

The natural frequencies of fluid vibrations in various layers of the atmosphere depend on the density of the fluids that make up those layers. The ionosphere itself is heterogeneous. Therefore, the frequency of vibrations at a given point fluctuates as the point moves through the ionosphere, following the path of the Moon. The first 5 harmonics of the Schumann resonance in the ionosphere potentially indicate 5 layers of ionic fluids in the ionosphere. The first harmonic (and the most powerful, at 7.83 Hz) shows the primary standing electromagnetic wave, the primary beneficiary of which is the Kukharev region.

The frequency of the noise comprises the following first 5 harmonics: 1st (main harmonic, i.e., the most powerful)— 7.83 Hz; $2^{nd}$ harmonic—14.1 Hz; $3^{rd}$ harmonic—20.3 Hz; $4^{th}$ harmonic—26.8 Hz, $5^{th}$ harmonic—32.9 Hz.

The main parameters of the ionosphere electron concentration, ion composition, and temperature vary with altitude in a complex way. The ionosphere comprises three main areas comprising maximum electron concentrations—layer D (80 km), layer E (110 km), and layer F, which is further divided into layers F1 (170 km) and F2 (300 km). The height values are approximations, the actual layer height, concentration, and other parameters experiencing significant variations, both regular and sporadic. Regular variations in layers D and E are primarily determined by the level of illumination of the ionosphere, with the detection of daily and seasonal variations being the most significant. In layer F, the influence of magnetospheric processes on the movement of plasma within the layer becomes most significant. The above-mentioned layers (I), E, F) comprise fluids of varying densities, and at the moments of gravitational resonances determined according to methods of the present invention, each layer emits standing electromagnetic waves comprising varying frequencies, all of which are located in the Kukharev region, albeit at higher altitudes than the stratopause. See FIG. 3.

In the ionosphere, and within the Kukharev region, the point of maximum power is the maximal point shown in FIG. 3, which depicts the main radiating antenna of the ionosphere at an exemplary location and time. The slope of the peak formed by the radiating antenna depends on the size and the density of the fluids that comprise the ionosphere. Secondary peaks to the peak of the Kukharev region are also possible, although likely with some local non-homogeneities.

Applications of the Invention to Interplanetary Space— Interplanetary space is not an absolute vacuum; it is filled with an interplanetary medium: plasma, dust and gas components, and permeated with electromagnetic radiation from the sun and other celestial bodies. Beyond the conventional boundary of interplanetary space is interstellar space. Interstellar medium —the substance and fields that fill interstellar space inside galaxies. Composition: interstellar gas, dust (1% of the gas mass), interstellar electromagnetic fields, cosmic rays, and hypothetical dark matter. Accordingly, there are a lot of different fluids everywhere. One can find fluids for any area of space, calculate gravitational resonances, and move to the Kukharev region where the wave originates. This will allow to constantly collect energy. One only needs to constantly search for plasma, electronic and electromagnetic clouds, and look for enough gravitational resonance force. Some general examples are provided hereinbelow.

Figure 10:
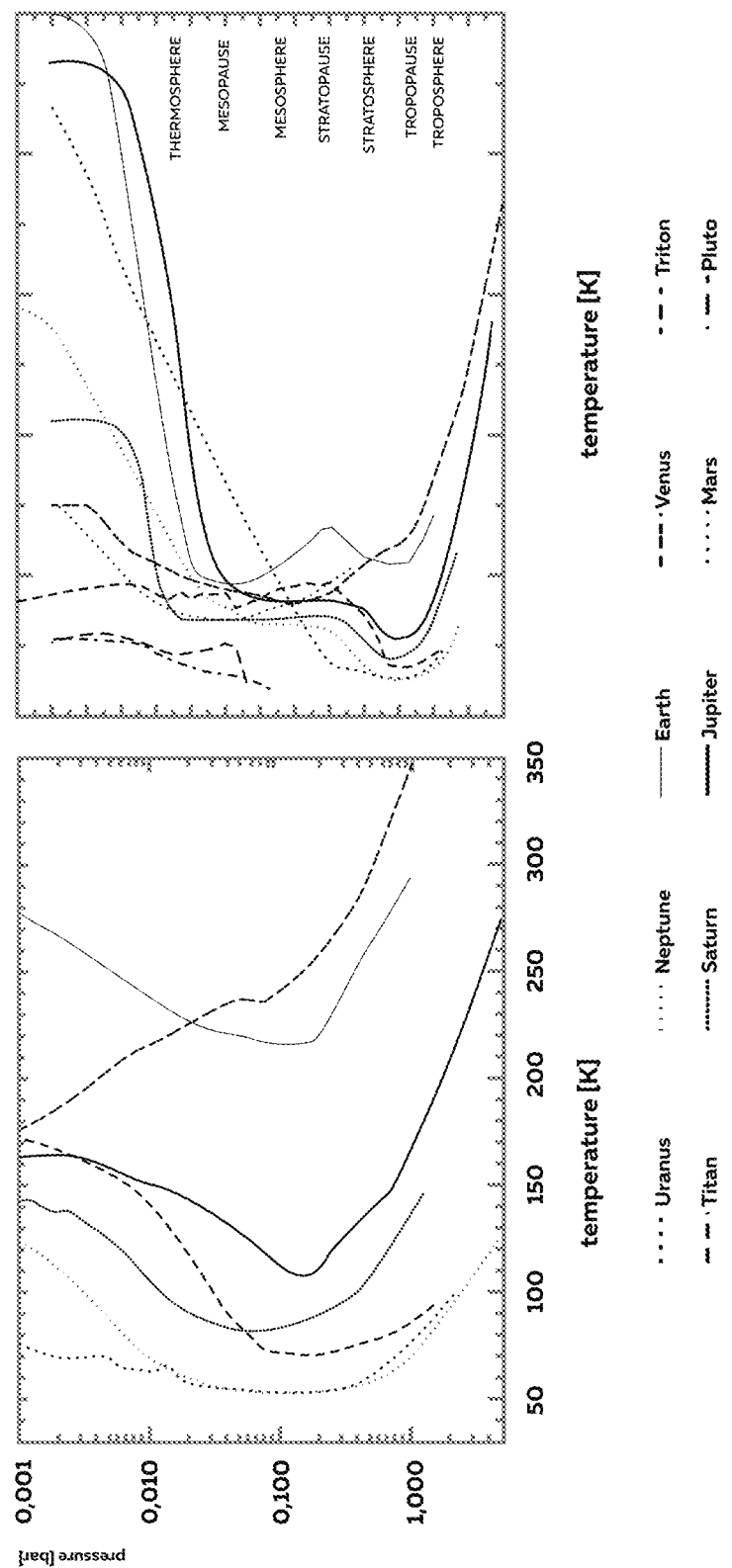
FIG. 10 shows temperature changes corresponding to pressures correlating to stratopauses of various planetary bodies within the Earth's solar system.
Figure 11:
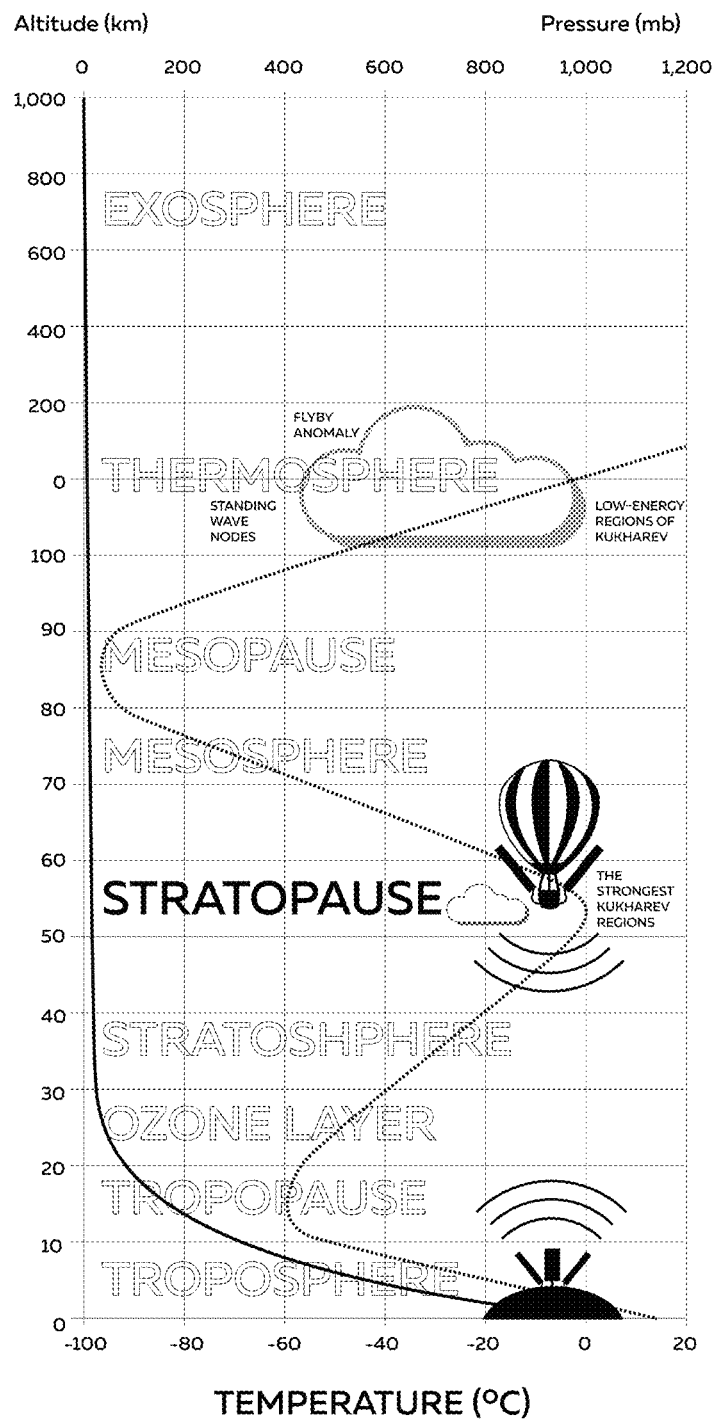
FIG. 11 shows an example of microwave directional transmission of electrical energy, collected at a moment of a gravitational resonance from a Kukharev region, and transmitted to the surface of a planet.

If a planet has no satellites, there is no gravitational resonance, and therefore, there are no Kukharev regions. A planet with no satellites further has no temperature increases forming a stratopause in its atmosphere. This is exemplified by FIG. 10, remembering to note how many satellites each of the planets of our solar system has.

If a planet has several satellites with significant mass, then gravitational resonances will differ from the characteristic features of resonances of gravitational tides in the Earth-Moon-Sun system. If the planet has an atmosphere, then temperature anomalies are inevitable, as a consequence of the influence of resonances of gravitational tides formed and the appearances of Kukharev regions at varying areas of the planet's atmosphere.

The energy of resonances of gravitational tides in the Kukharev region may also be utilized as a modulating energy for: 1) solar wind in the ionosphere, 2) temperature anomalies in oceans. The influence of resonances of gravitational tides is exerted both on the ionosphere and on the hydrosphere.

Applications of the Invention to Large Bodies of Water. Oceans and seas are also fluids, and one can calculate the Kukharev region for such bodies of water. The feasibility of moving a large underwater vehicle along the crest of the gravitational resonance seems ineffective (taking into account the volume of incoming electricity). The most cost-effective option is a light unmanned underwater vehicle, for which a few Watts of constant free electricity will be economically significant. Such a device will be able to constantly move for free over considerable distances in the oceans (until it hits land).

Other Applications of the Invention. All that is said above is applicable to light unmanned aerial vehicles in the atmosphere, in lower layers of the atmosphere, because the power of fluids in the lower layers of the atmosphere can provide free electricity of relatively low power along the peak of the Kukharev region.

Underground rivers, magma, and fluids in the mantle are also fluids. If considering the liquids in the upper layer of the mantle of the planet Earth, the presented technology also makes sense if the fluid size is sufficient. But there, in addition to electrical energy in the Kukharev region, one should look for thermal resonance as a condition for heat transfer.

In the middle of the ionospheres of at least Mars, Jupiter, and Saturn, there is more energy due to the size of the fluids and the greater magnitude of the gravitational resonances occurring on those planets. In theory, and likely in practice, utilizing the energy formed within Kukharev regions would be even more cost-effective relative to doing so on the Earth. See FIG. 10, which further indicates this likelihood for the planets indicated therein.

Any source of radiation will not be able to direct its electromagnetic wave directly/only at the receiver, due to diffraction. Accordingly, the power receiver should be placed as close to the source as possible.

To receive electrical energy, a resonant oscillatory circuit (or other methods of wireless energy reception) may be used. As with all resonant induction, the transmitter and receiver should set to the same frequency. Pulsed energy transfer occurs over several cycles. Significant power thus builds up and can be transferred between two mutually configured LC circuits (i.e. resonant circuits) with a relatively low coupling coefficient. The receiving coil is usually a single-layer solenoid or flat helix with a set of capacitors that allow to adjust the receiving element to the frequency of the transmitter. Resonance is used in practice in the receiver module (built into the load) to ensure maximum efficiency of energy transfer.

To receive electrical energy, the device may also utilize electromagnetic induction or magnetic resonance methods. Electromagnetic induction ensures the operation of the transformer. The alternating current of the primary winding excites, according to the law of electromagnetic induction, a variable magnetic flux in the core, which, in turn, excites the EMF of induction in the secondary winding. The magnetic resonance method comprises resonant binding using the magnetic field of the receiver and transmitter.

Alternating current may be transmitted through any layers of the atmosphere that have a low atmospheric pressure. Current may thereby flow, e.g., by means of electrostatic induction through the lower layers of the atmosphere and, due to the flow of the ions, i.e. the electrical conductivity, through an ionized area located at any altitude above 5 km. As a result of the alternating current, a stream of electric current may be formed between two elevated antennas, wherein a first antenna sends a signal passing to the troposphere, through the troposphere, and to the second antenna (and perhaps vice versa, if necessary). Thereafter, the second antenna might further transmit to a surface antenna/device, if needed.

One should be careful in resonating the resonance, i.e., in strengthening the radiating antenna within the Kukharev region with additional directed power. Such additional directed power may lead to powerful bursts of energy and/or ionospheric illumination. Such bursts or ionospheric illumination may result in the formation of plasma clouds, which create dangerous conditions for aircraft, and through which radio waves will not transmit.

General example of setting the problem for determining the gravitational resonance (FIG. 4). Enter the coordinate system, x, y, z, with the ORTs, $\vec{j}$, $\vec{j}$, $\vec{k}$. An ORT is defined as a unit radius vector that is equally oriented with a certain radius vector of arbitrary length and lies on the same line. The z-axis is directed along the Earth's axis, the y-axis is directed along the intersection of the Earth's equatorial plane/the plane of the Earth's orbit around the Sun, and the x-axis is directed perpendicular to the y- and z-axes. The origin of the coordinate system is the center of the Earth. FIG. 4 provides illustrative detail.

As a consequence, the Radius-vector of a point on the earth's surface comprises:

$$r_x = R \cdot \cos\varphi \cdot \sin(wt+\lambda) \quad \text{(Equation 3);}$$

$$r_y = R \cdot \cos\varphi \cdot \cos(wt+\lambda) \quad \text{(Equation 4);}$$

$$r_z = R \cdot \sin\varphi \quad \text{(Equation 5);}$$

where $\lambda$ is longitude, and where $\varphi$ is latitude.

At a point on the terrain, Cartesian coordinates, x, y, z, with the ORTs, $\vec{n_1}$, $\vec{n_2}$, $\vec{n_3}$, are entered.

The x-axis is directed east, the z-axis is directed vertically upward, and the y-axis is directed south. The unit ORTs, $\vec{n_1}$, $\vec{n_2}$, $\vec{n_3}$, depend on time, as follows:

$$\vec{n_1} = \vec{i} \cdot \cos(wt+\lambda) - \vec{j} \cdot \sin(wt+\lambda); \quad \text{(Equation 6)}$$

$$\vec{n_3} = \frac{\vec{r}}{|\vec{r}|} = \quad \text{(Equation 7)}$$

$$\vec{i} \cdot \cos\varphi \cdot \sin(wt+\lambda) + \vec{j} \cdot \cos\varphi \cdot \cos(wt+\lambda) + \vec{k} \cdot \sin\varphi; \text{ and}$$

$$\vec{n_2} = [\vec{n_1} \cdot \vec{n_3}] = \quad \text{(Equation 8)}$$

$$-\vec{i}\sin(wt+\lambda) \cdot \sin\varphi - \vec{j} \cdot \cos(wt+\lambda) \cdot \sin\varphi + \vec{k} \cdot \cos\varphi;$$

The Sun's gravitational force is calculated as follows:

$$F_{cx} = F_c \cdot \cos(\Omega t + \psi) \cdot \cos\theta; \quad \text{(Equation 9)}$$

$$F_{cy} = F_c \cdot \sin(\Omega t + \psi); \quad \text{(Equation 10)}$$

$$F_{cz} = F_c \cdot \cos(\Omega t + \psi) \cdot \sin\theta; \text{ and} \quad \text{(Equation 11)}$$

$$F_c = G \cdot \frac{M_c \cdot m}{R_c^2}; \quad \text{(Equation 12)}$$

Above, $\theta$ is e angle between the Earth's axis and the plane perpendicular to the plane of the Earth's orbit (which does not depend on time), and $\Omega$ is the angular velocity of the Earth's rotation around the Sun. Based on the above equations, it follows that one of the most effective applications of the present invention is its applications to ion engines flying at the angular speed of the moon.

Examples Comprising Preferred Embodiments.

According to preliminary data, the Kukharev regions in the Earth-Moon-Sun system which contain the highest energy are located at an altitude of about 55-60 km from the Earth's surface. Kukharev regions will appear with different energies at the moments of gravitational resonances. By utilizing the maximum amounts of energy provided at the particular moments of 14-day resonances, various Kukharev areas may be utilized not only by satellites and probes, but also by devices/vehicles for organizing the obtained energy and transferring it to the Earth's surface.

Figure 5:
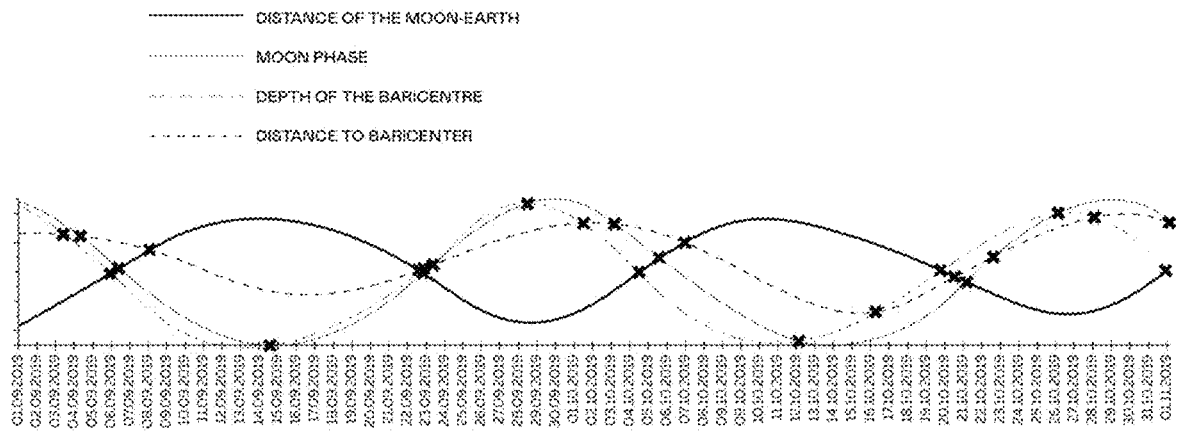
FIG. 5 shows a graph of a case study for determining one or more moments of resonance in the North Sea, England.
Figure 6:
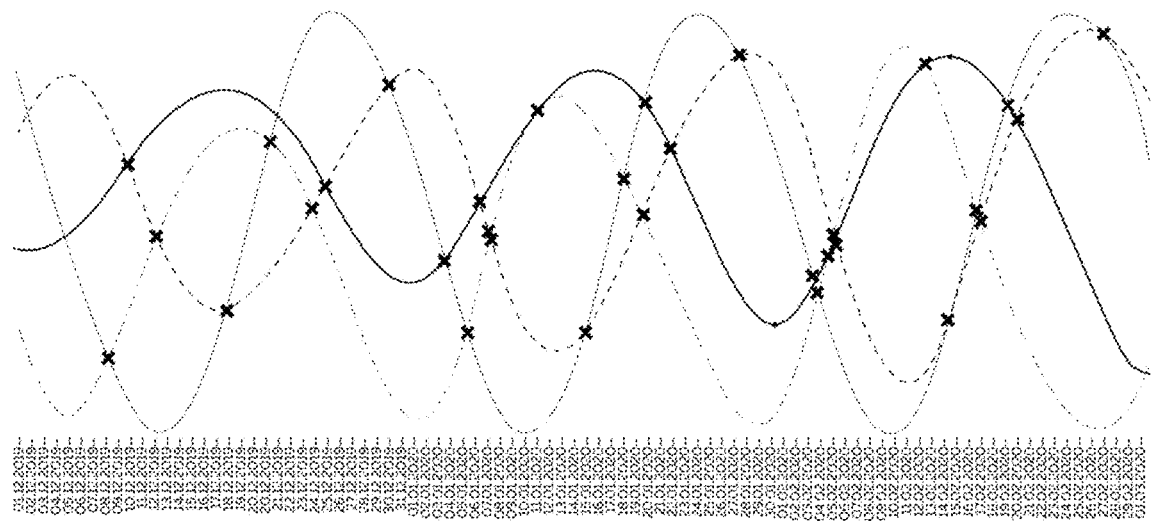
FIG. 6 shows a graph of a case study for determining one or more moments of resonance in the town of Elko, Nev.

FIG. 5 shows a graphical representation of a case study performed at the North Sea, England. The graph shows how a day of resonance. FIG. 6 shows a second exemplary graphical representation of a similar case study performed in Elko, Nev.

Once the GPS coordinates of a location are determined, the days of resonances may be calculated according to the methods described herein. Once the days of resonances are determined, any device according to the present invention which is placed in the Kukharev region during one or more days of resonance will receive electrical power as a result of the gravitational resonances' effect on the Kukharev region of the Earth's atmosphere.

Figure 9:
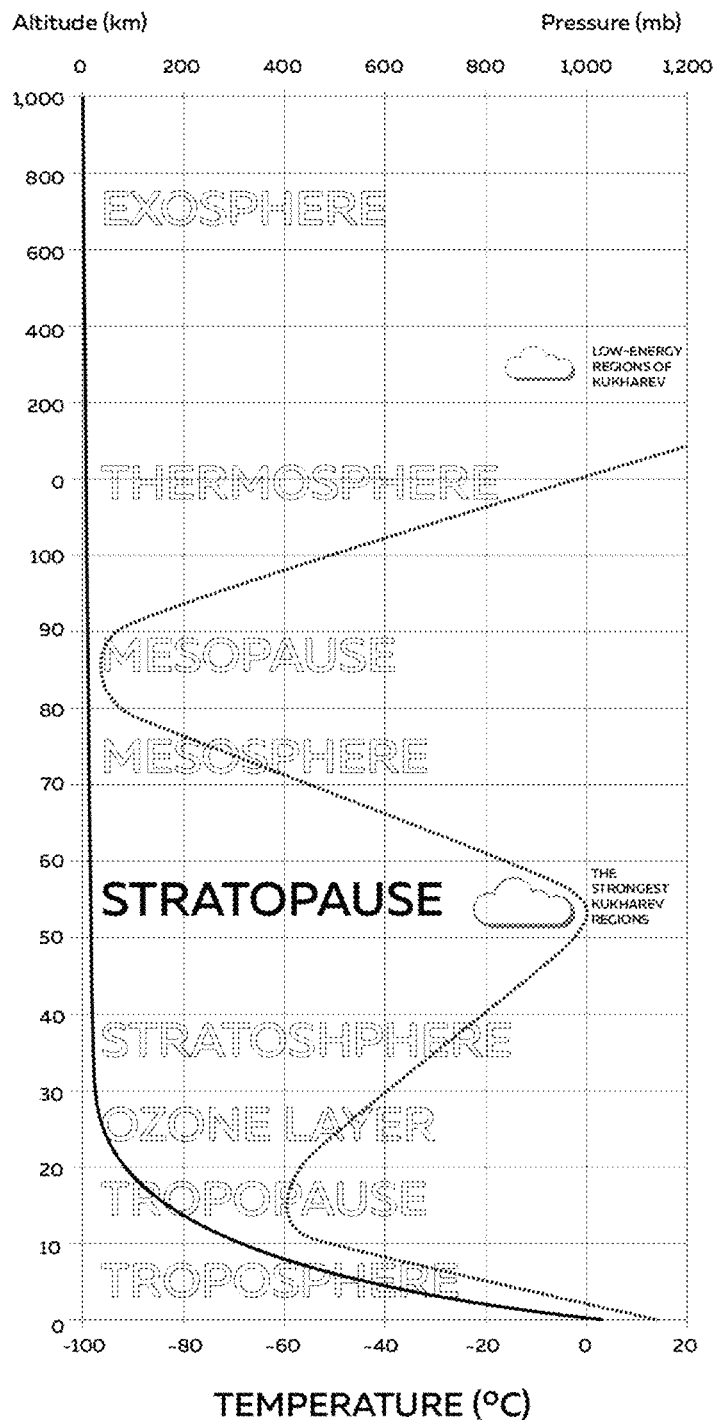
FIG. 9 illustrates the relative location of the stratopause, and its increased temperature during gravitational resonances, in relation to other layers of the Earth's atmosphere.

As noted previously, Kukharev regions in different layers of different atmospheric media will generate Schumann waves/resonances. The center of a Kukharev region is the maximum of a standing wave resonating throughout an entirety of the ionosphere. Temperature anomalies within stratopauses of the Earth's atmosphere, where positive temperatures are recorded even at altitudes of 50-60 km, result from the formation of Kukharev regions, as shown in FIG. 9.

When gravitational resonances occur, powerful electromagnetic oscillations are generated. Gravitational resonances occur quite frequently on the planet; therefore, via determining Kukharev regions and the timing of said resonances, the electromagnetic oscillations created within the ionosphere as a result of the resonances is utilized by the devices of the present invention.

At the moment of a gravitational resonance, electromagnetic radiation increases, as does the temperature, within a Kukharev region. The electromagnetic field within a Kukharev region gradually becomes much stronger. The resonance gradually increases for about three hours, then remains stable for a variable period of time, and finally gradually lowers for about 3 hours. By combining data about resonances of, e.g., 14-day gravitational tides in the Earth's crust with data obtained, e.g., from the monitoring of Schumann resonances, it is possible to locate and identify the timing of Kukharev regions with high accuracy. The variable period of time during which the resonance remains stable depends on, e.g., the energy amount of the resonance, and/or how many oscillations coincide. For example, strong resonances based on 14-day gravitational tides, occur about once every 14 days, lasting for up to 24 hours (i.e., the variable period of time is up to 24 hours).

It is also possible to use energy due to the temperature difference between the "hump" and the stratosphere, and forecast maximum energy efficiency of the wireless energy transfer technology within the globe. For example, photonic heat transfer may be utilized. Alternatively, quantum noise transfer may be utilized.

A gravitational resonance normally lasts rather long (e.g., up to 24 hours). Therefore, a plurality of Kukharev regions may be indicated as they are formed along an atmosphere of any given gravity-effected medium. See FIG. 12.

Resonances can occur every 3-4 days. When phases match, energy goes up. If there is a phase opposition, it decreases.

A half-period of the lunar cycle gives the strongest effect (i.e. a 14-day gravitational resonance is the strongest one of these gravitational resonances).

Confirmation of the Existence of Kukharev Regions. In order to confirm that a predicted Kukharev region exists, one may compare against increases of Schumann resonance amplitudes during 14-day tidal gravitational resonances. The following steps may be taken to make such a confirmation/correlation:

1. Calculate the gravitational resonance dates.
2. Arrange to register Schumann waves on the Earth's surface (e.g., using magnetometers and electrical receivers with a frequency range of 0.1 to 50 Hz).
3. Obtain open source temperature gradient data, e.g., from the US Suomi satellite.
4. A perfect correlation should exist between the sets of data above, confirming the presence of Kukharev regions.

The correlation of atmospheric temperature anomalies to tidal gravitational resonances is almost perfect, clearly evidencing the existence of Kukharev regions. Compare, for example, the vertical temperature distribution in the disturbed atmosphere over the seismically active territory of the northwestern part of the Zagros mountain system with the moments of gravitational resonances, as shown in FIGS. 7-8. A connection between Schuman resonance amplitude anomalies and 14-day tidal gravitational resonances may also be found using and comparing nearly any data for Schumann resonances over a period of several months.

This data can then be checked against gravitational tides. Besides utilizing energy in Kukharev regions right where they are formed, this energy can be transmitted to the Earth's surface in varying available manners. Examples of such transmission include but are not limited to on-site processing of energy in the Kukharev region into a directed microwave radiation for transmission to consumers (many known methods currently exist), as well as laser-implemented transmission to consumers (many known methods also currently exist).

To do so, it is necessary to transmit across a long distance (i.e., through the stratosphere) the energy of the temperature hump in the gravitational resonance periods. Emergence of thermal anomalies, change of the ozone layer, and other sharp changes that come and go—all of these result from the formation of Kukharev regions and the electromagnetic effects within each one of the regions.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for harvesting energy, comprising:
   providing a receiving device for said energy, positioning said receiving device in an atmosphere of Earth, having a moon,
   determining moments of one or more resonances of gravitational tides occurring in a high-intensity region within said atmosphere, wherein said high-intensity region within said atmosphere is located at a classical stratopause altitude of 50-60 km or at an altitude of about 120 km, said one or more resonances of gravitational tides forming during a constructive interference of gravitational forces affecting the Earth, said high-intensity region comprising electromagnetic waves at an intensity greater than any surrounding region, each of said moments of one or more resonances of gravitational tides comprising a given location and a calculated period of time, moving said receiving device to one of said moments of one or more resonances of gravitational tides, receiving at said moments of one or more resonances of gravitational tides, via said receiving device, electricity resulting from said energy formed within said high-intensity region, and storing said electricity within said receiving device.

2. The method of claim 1, wherein said one or more resonances of gravitational tides comprise 14-day gravitational tide resonances formed between Earth and its moon.

3. The method of claim 1, wherein said calculated period of time comprises:
   a first period comprising a gradual increase in said energy within said high-intensity region,
   a second period comprising a maximum standing wave energy within said high-intensity region, and
   a third period comprising a gradual decrease of said energy within said high-intensity region.

4. The method of claim 3, wherein said second period is up to 24 hours.

5. The method of claim 4, wherein said first and third periods are each 3-4 hours.

6. The method of claim 1, further comprising transmitting said energy stored in said receiving device to a surface device located on a surface of the Earth by directed microwave radiation or using a laser.

7. The method of claim 6, where said transmitting comprises sending and receiving alternating currents.

8. The method of claim 1, wherein said receiving device is located on an unmanned aerial vehicle (UAM), said UAM moving within said atmosphere and orbiting the Earth, such that said moving maintains said receiving device within said high-intensity region.

9. The method of claim 1, wherein said receiving device utilizes electromagnetic induction (inductive coupling) to collect said energy.

10. The method of claim 1, wherein said receiving device comprises one or more resonant circuits.

11. The method of claim 1, wherein said given location comprises a latitude, a longitude, and an altitude of said receiving device.

12. The method of claim 1, wherein a secondary receiving device is positioned at a boundary of said high-intensity region.

13. The method of claim 1, wherein said receiving device is programmable to receive frequencies ranging from 0 Hz to 100 kHz, wherein the receiving device is tuned to the same frequency with which the high-intensity region generates electromagnetic waves.

14. The method according to claim 1, in which energy is transferred between two electrodes by electrical conduction through ionized air.

15. The method of claim 1, wherein when the one or more resonances of gravitational tides from air molecules and various charged particles create areas of electromagnetic energy growth beyond the classical stratopause at an altitude of 50-55 km and creating temperature anomalies at the moments of the one or more resonances of gravitational tides.

16. The method according to claim 1, wherein signs of the high-intensity region in an ionosphere include temperature anomalies that occur there at the moments of the one or more resonances of gravitational tides from different particles.

* * * * *